US006563523B1

(12) United States Patent
Suchocki et al.

(10) Patent No.: US 6,563,523 B1
(45) Date of Patent: May 13, 2003

(54) GRAPHICAL CONTROL OF A TIME-BASED SET-UP FEATURE FOR A VIDEO GAME

(75) Inventors: Edward J. Suchocki, Buffalo Grove, IL (US); Christopher M. Steele, Mount Prospect, IL (US)

(73) Assignee: Midway Amusement Games LLC, Chicago, IL (US)

( * ) Notice: Subject to any disclaimer, the term of this patent is extended or adjusted under 35 U.S.C. 154(b) by 0 days.

(21) Appl. No.: 09/428,355

(22) Filed: Oct. 28, 1999

(51) Int. Cl.[7] .............................. G09G 5/00; A63F 13/00
(52) U.S. Cl. ....................... 345/974; 345/833; 345/835; 345/857; 345/963; 345/970; 463/1; 463/30
(58) Field of Search ................................. 345/333, 334, 345/716, 719, 718, 727, 730–732, 867, 2, 326, 156, 833, 835, 856, 440, 440.2, 968, 967, 722, 974, 970, 963; 348/5.5; 364/145; 463/37; 705/14, 8, 9

(56) References Cited

U.S. PATENT DOCUMENTS

| | | | | |
|---|---|---|---|---|
| 4,905,280 A | * | 2/1990 | Wiedemer | 463/40 |
| 5,559,301 A | * | 9/1996 | Bryan, Jr. et al. | 345/173 |
| 5,615,347 A | * | 3/1997 | Davis et al. | 395/349 |
| 5,634,849 A | * | 6/1997 | Abecassis | 463/30 |
| 5,731,997 A | * | 3/1998 | Manson et al. | 364/559 |
| 5,760,788 A | * | 6/1998 | Chainini et al. | 345/474 |
| 5,781,894 A | * | 7/1998 | Petrecca et al. | 705/14 |
| 5,805,444 A | * | 9/1998 | Seymour | 364/145 |
| 5,892,519 A | * | 4/1999 | Hirai | 345/334 |
| 5,930,501 A | * | 7/1999 | Neil | 345/334 |
| 6,025,869 A | * | 2/2000 | Stas et al. | 348/5.5 |
| 6,034,652 A | * | 3/2000 | Freiberger et al. | 345/2 |
| 6,169,540 B1 | * | 1/2001 | Rosenberg et al. | 345/326 |
| 6,210,279 B1 | * | 4/2001 | Dickinson | 463/37 |
| 6,285,351 B1 | * | 9/2001 | Chang et al. | 345/156 |
| 6,292,170 B1 | * | 9/2001 | Chang et al. | 345/156 |
| 6,380,953 B1 | * | 4/2002 | Mizuno | 345/764 |

OTHER PUBLICATIONS

Drawing of Setup Screen Including Erotica Control Touchmaster, Midway Amusement Games, LLC, Chicago, Illinois, p. 1, (1997).
Drawing of Setup Screen Including Volume Control Touchmaster, Midway Amusement Games, LLC, Chicago, Illinois, p. 1, (1996).

* cited by examiner

Primary Examiner—Bipin Shalwala
Assistant Examiner—David L. Lewis
(74) Attorney, Agent, or Firm—Jenkens & Gilchrist (57) ABSTRACT

In one aspect of the present invention, there is provided a graphical control of a time-based set-up feature for a video game. The graphical control including a graphical interface for visually displaying a plurality of symbols of the set-up feature along a first axis and a plurality of time periods along a second axis. The graphical control further including a selector for interacting with the graphical interface to select one or more of the symbols during one or more of the time periods.

12 Claims, 7 Drawing Sheets

GRAPHICAL CONTROL OF A TIME-BASED SET-UP FEATURE FOR A VIDEO GAME

FIELD OF THE INVENTION

The present invention relates generally to video games and, more particularly, to a graphical control of a time-based set-up feature for a video game.

BACKGROUND OF THE INVENTION

Video games are played in a variety of environments such as game rooms, hotel lobbies, and casinos. In some environments, adult video games are played. However, operators generally like to control the times at which certain features in video games are activated. For example, adult strip poker games may have a variety of modes including bikini, topless and nude. As their names suggest, in bikini mode the video representation will strip to his/her bikini, in topless mode the video representation will strip off his/her top and in nude mode the video representation will strip off all of his/her cloths. Operators have typically only been able to control whether a feature is on or off during a particular time period each day. For example, prior video games only allowed an operator to turn on the nude mode once per day between, e.g, 10 pm and 2 am. They would not allow the operator the ability to select multiple time periods during which, e.g., nude mode was on. For example, an operator could not turn the nude mode on between 8 pm–10 pm; 11 pm–2 am; and 3 am–5 am. Similarly, the other modes of operation were limited to one "on" time period.

Similarly, operators have typically only been able to control the magnitude of a parameter for a certain time period. For example, prior video games only allowed an operator to adjust (increase) the volume of a video game for one time period, e.g., between 10 pm and 2 am.

Accordingly, there is a need for graphically controlling a time-based set-up feature for a video game such that an operator can easily select multiple "on" time periods for each of several modes of operation and/or select one or more magnitudes for one or more time periods. The present invention is directed to addressing one or more of these needs.

SUMMARY OF THE INVENTION

In one aspect of the present invention, there is provided a graphical control of a time-based set-up feature for a video game. The graphical control including a graphical interface for visually displaying a plurality of symbols of the set-up feature along a first axis and a plurality of time periods along a second axis. The graphical control further including a selector for interacting with the graphical interface to select one or more of the symbols during one or more of the time periods.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 1:
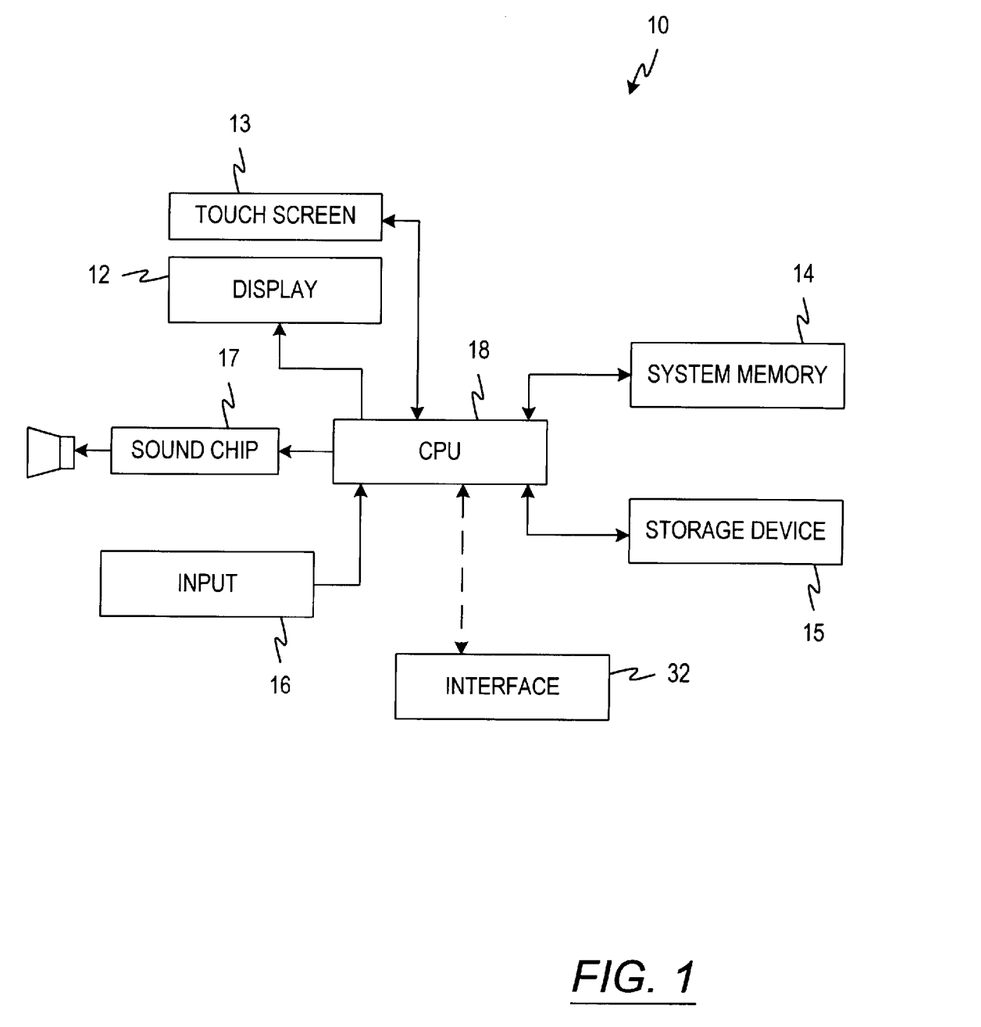
FIG. 1 is a functional diagram of a graphical control of a time-based set-up feature for a video game system according to one embodiment of the present invention.

Turning now to the drawings and referring initially to FIG. 1, a video game system 10 comprises a video display 12, a system memory 14, a long-term storage device 15, an input 16, a sound chip/speaker 17, and a central processing unit (CPU) 18. In the illustrated embodiment, the video display 12 is a typical cathode ray tube (CRT) monitor overlaid with a touch-screen 13. In another embodiment, an operator interface 32 is employed to interact with the video display 12. The operator interface 32 may comprise physical keys, buttons, a joystick, a trackball, a mouse, etc. for interacting with the video display 12.

Referring to FIG. 1, the video game system 10 operates as follows. In one embodiment, the input 16 is a coin input device that signals the CPU 18 that coins or tokens have been deposited. The CPU 18 then displays a selection screen on the display 12 that allows a player to select a game once the minimum number of coins/tokens have been deposited. The CPU 18 controls, among other things, game play, the video display 12, and the audio played on the speaker 17. In addition, the CPU 18 translates the input from the touch-screen 13 or the operator interface 32. The player interacts with the game system 10 via the touch-screen 13. In one embodiment, the touch-screen 13 is a standard MicroTouch capacitive touch-screen and controller sold by MicroTouch Systems, Inc., Methuen, Mass. The touch-screen 13 senses the presence of a pressure device, such as a human finger, or a pointer, on the screen and calculates a coordinate to correspond to the position of the pressure device on the screen 13.

In one embodiment, the video display 12 visually displays a video game selection menu, one or more video games, and operator set-up screens. The player selects a game from the video game selection menu displayed on the display screen 12. The games are listed by category. The player inserts the correct number of tokens or coins needed to play the game and then chooses a particular game. The CPU 18 then loads the corresponding software from the long-term storage device 15 into the system memory 14 for execution.

The operator set-up screens allow an operator where the game is located to change certain game parameters. The operator views a list of adjustments on the display 12 and changes certain game parameters such as the mode of operation (e.g., off, bikini, topless, nude), and the magnitude of the volume of the video game for a certain time period. The set-up screens also include a list of audits for recording events that happened in a game (e.g., how many and when bonus games were awarded, when the system was being played). The audits can be used to determine how to change the game parameters to maximize earnings and game appeal.

Once a game is selected and the software is loaded, the CPU 18 displays the graphics that correspond to the game and the game begins. The system 10 then displays a game objective screen to give the player a basic idea of how to play the game. Each game also includes a help button on the display 12 that allows a player to read a more detailed set of game rules. Many of the games in the system 10 have a bonus level for players who reach a certain score, or complete a certain percent of the game in a time period, or complete a set number of rounds in a game. The bonus level is, e.g., an extra round of game play. An operator can also select, e.g., whether the player can win a free game if they achieve the high score for the game. The operator can also adjust the system 10 such that bonus rounds are awarded for a fixed level of achievement by a player or by an automatic (system determined) level of achievement by a player. The fixed level can be, e.g., easy or hard to reach. The skill level of the players in a given location determines the automatic level of achievement. Thus, if players are not great game players, the bonus level will be reduced and if players are very good, the bonus level will be increased. The CPU 18 uses the adjustments and audits in order to determine the automatic achievement levels for each game.

The video display 12 is controlled by the CPU 18 which provides the graphics that are displayed on the video display 12. The CPU 18 also generates audio sound which is downloaded to the sound chip 17. The sounds are stored in a digital format on the storage device 15 and loaded into the system memory 14 once a game is selected. The CPU 18 will send sound data corresponding to the particular game to the sound chip/speaker 17 to be played.

Game play is ended, for example, after the game objectives are met, time has run out, the player wins, the player runs out of valid moves for the game selected, etc. The game then returns to an attract mode in which the video display 12 displays various graphics based on the time of day. Some of these graphics include: a list of games that can be played on the system, high scores from other games, advertising screens, graphics from other games and pricing information.

Figure 2:
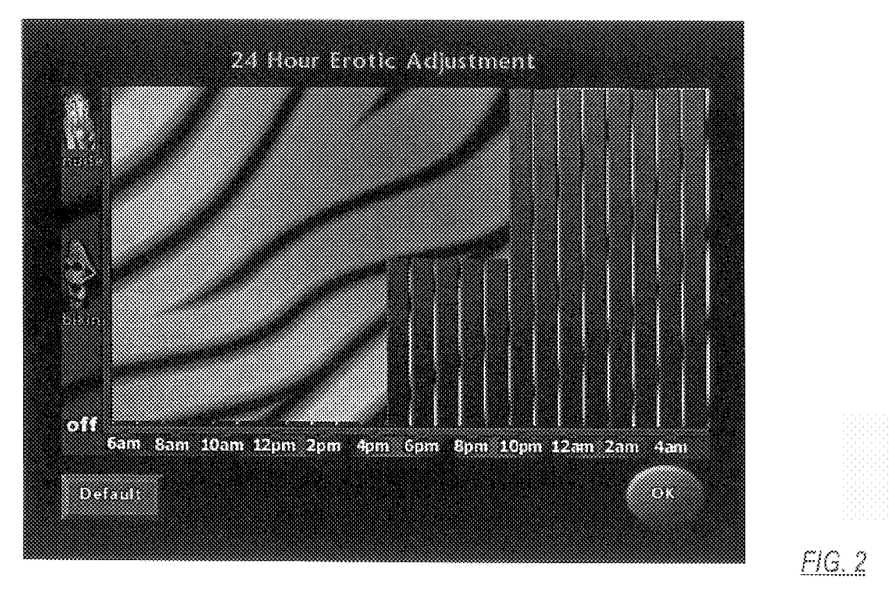
FIGS. 2–4 are example graphical interfaces that allow an operator to adjust the mode of operation of erotica used in the video game system.
Figure 3:
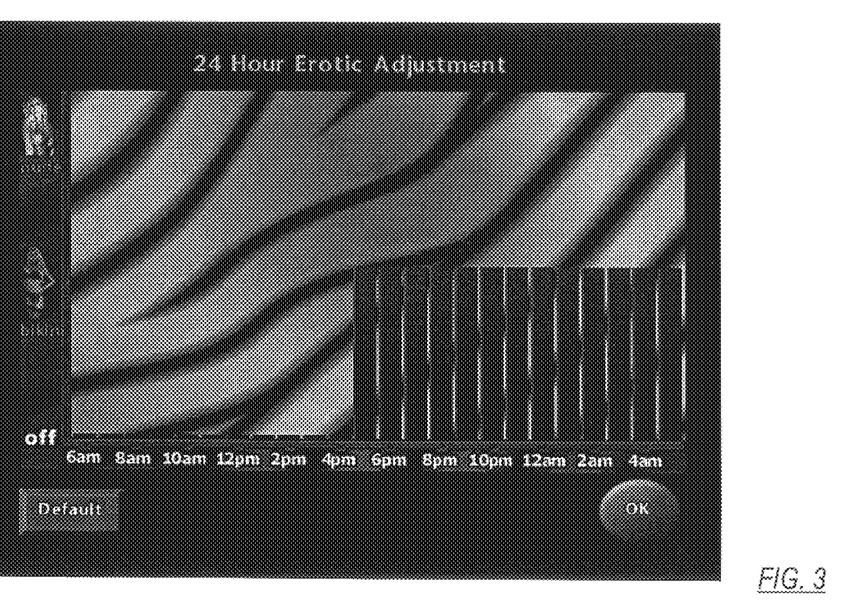
Figure 4:
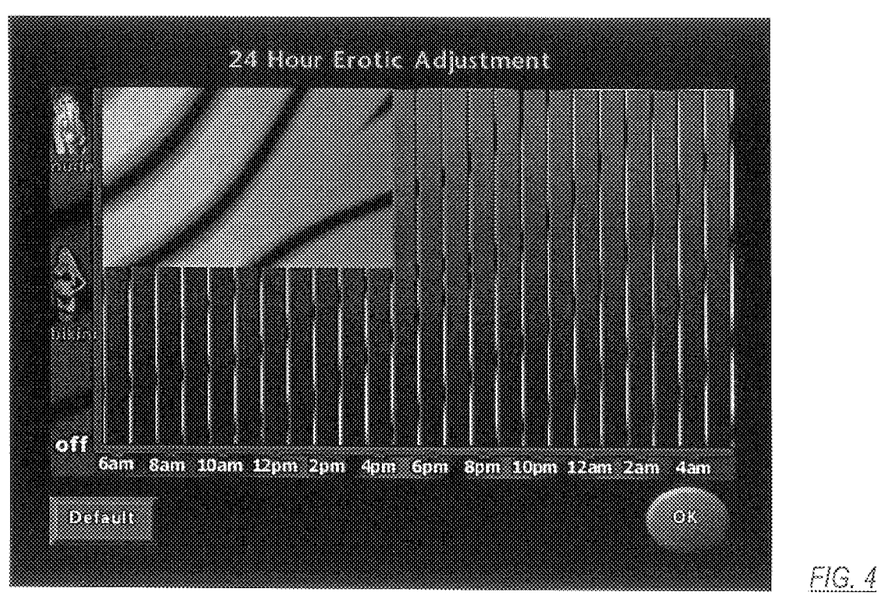

In one embodiment, the video display 12 visually displays operator set-up screens such as the ones shown in FIGS. 2–7. In the illustrated operator set-up screens, a plurality of symbols (e.g, off, bikini, nude) are displayed along the y-axis and a plurality of time periods (e.g, in one hour increments) are displayed along the x-axis, as shown in FIGS. 2–4. In the touch-screen embodiment of this invention, an operator may select one or more of the symbols during one or more of the time periods as follows.

The symbols are selected for each time period by touching the screen at the appropriate x-y intercept. In one embodiment, the symbols represent modes of operation of erotica used in some of the video games. Examples of possible modes of operation include off, bikini, and nude. To turn the bikini mode on from 5 pm–9:59 pm, an operator merely touches the display screen 12 with a pressure device at the intersection of an imaginary horizontal line adjacent the "bikini" symbol on the y-axis and an imaginary vertical line adjacent the 5 pm symbol on the x-axis. The pressure device may comprise a person's finger, a pen tip, a pointer, etc. The operator then merely drags the pressure device across the screen in the horizontal direction until reaching an imaginary vertical line adjacent the 9 pm symbol on the x-axis. In other words, the operator touches the screen 12 at a first x-y coordinate on the screen 12 and drags, e.g., a finger across the screen in the horizontal direction until reaching a second x-y coordinate. This will produce a plurality of vertical lines extending to the imaginary horizontal line adjacent the "bikini" symbol on the y-axis, as shown in FIG. 2. Thus, the bikini mode is now on for the time period selected, i.e., between 5 pm–9:59 pm.

Similarly, to turn the nude mode on from 10 pm–5:59 am, an operator merely touches the display screen 12 at the intersection of an imaginary horizontal line adjacent the "nude" symbol on the y-axis and an imaginary vertical line adjacent the 10 pm symbol on the x-axis. The operator then merely drags a pressure device across the screen in the horizontal direction until reaching an imaginary vertical line adjacent the 5 am symbol on the x-axis. This will produce a plurality of vertical lines extending to the imaginary horizontal line adjacent the "nude" symbol on the y-axis, as shown in FIG. 2. Thus, the nude mode is now on for the time period selected, i.e., between 10 pm–5:59 am.

Likewise, an operator can select discrete time periods during which any of the modes are on. For example, to turn bikini mode on from 5 pm–5:59 pm and 8 pm–9:59 pm, an operator merely touches the display screen 12 at the intersection of an imaginary horizontal line adjacent the "bikini" symbol on the y-axis and an imaginary vertical line adjacent the 5 pm symbol on the x-axis. This will produce a vertical line extending from the 5 pm symbol to the imaginary horizontal line adjacent the "bikini" symbol. Then, after removing the pressure device from the display screen 12, the operator touches the display screen 12 at the intersection of an imaginary horizontal line adjacent the "bikini" symbol and an imaginary vertical line adjacent the 8 pm symbol and drags a pressure device across the screen in the horizontal direction until reaching an imaginary vertical line adjacent the 10 pm symbol. This will produce two vertical lines extending from the 8 pm and 9 pm symbols to the imaginary horizontal line adjacent the "bikini" symbol. Thus, the bikini mode is now on for the time periods selected, i.e., between 5 pm–5:59 pm and 8 pm–9:59 pm.

Figure 5:
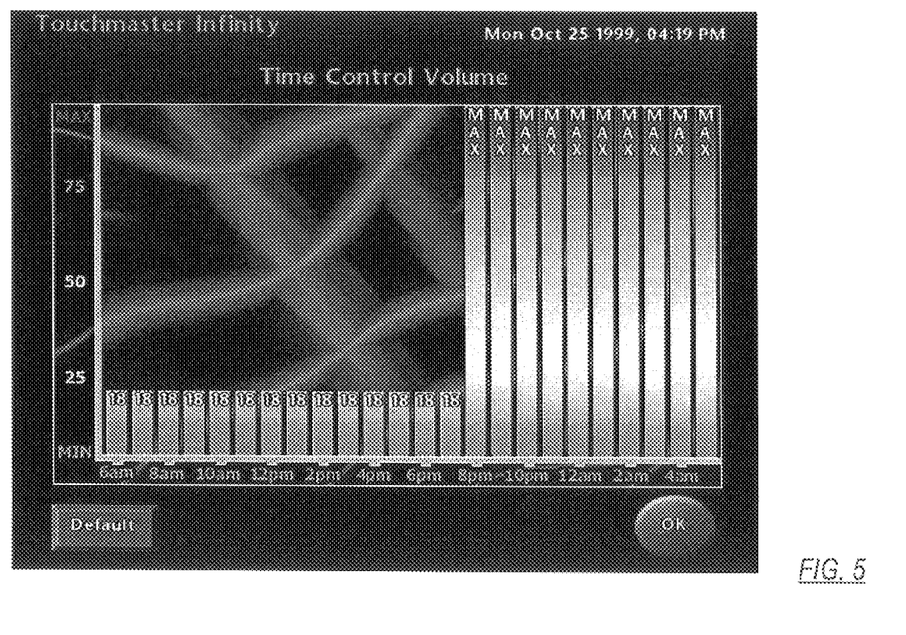
FIGS. 5–7 are example graphical interfaces that allow an operator to adjust the volume of the video game system.
Figure 6:
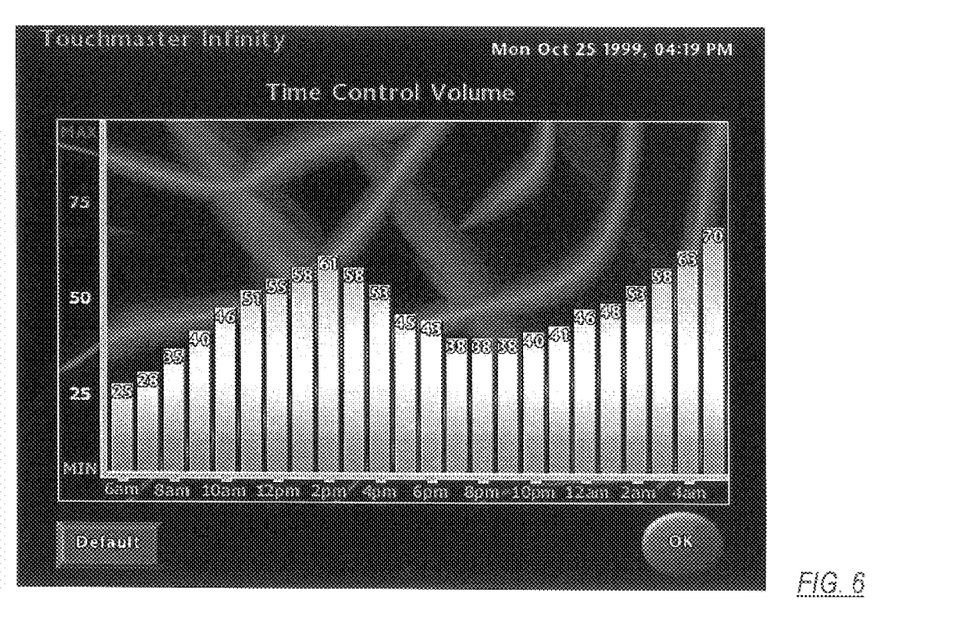
Figure 7:
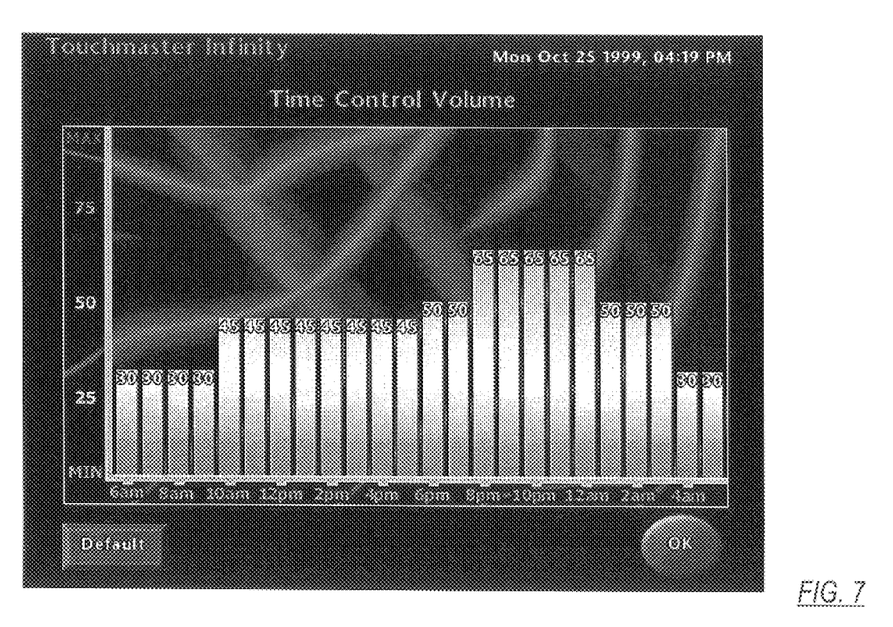

In another embodiment, the symbols represent a plurality of magnitudes. The magnitudes may represent, for example, levels of volume. FIGS. 5–7 illustrate the display screen 12 displaying an operator set-up screen for selecting various magnitudes during various periods of time. For example, the magnitudes may correspond to volume levels at which the video game will operate during a given time period. As shown in FIG. 7, to adjust the volume from 6 am–9:59 am to 30, an operator merely touches the display screen 12 at the intersection of an imaginary vertical line adjacent the 6 am symbol on the x-axis and an imaginary horizontal line slightly above the 25 symbol on the y-axis. Touching the screen at this location will display the volume level associated with the vertical displacement of the pressure device. Then, by dragging the pressure device vertically up and down, the volume can be adjusted to the desired level. When the desired volume level is obtained, the operator can drag the pressure device across the screen in the horizontal direction until reaching an imaginary vertical line adjacent the 9 am symbol on the x-axis. This will produce four vertical lines extending from the x-axis to the 30 volume level, as shown in FIG. 7. Thus, the volume between 6 am–9:59 am will be set to 30.

Similarly, to adjust the volume from, e.g., 8 pm–12:59 am to 65, an operator merely touches the display screen 12 at the intersection of an imaginary vertical line adjacent the 8 pm symbol on the x-axis and an imaginary horizontal line slightly below the 75 symbol on the y-axis. Touching the screen at this location will display the volume level associated with the vertical displacement of the pressure device. Then, by dragging the pressure device vertically up and down, the volume can be adjusted to the desired level. When the desired volume level is obtained, the operator can drag the pressure device across the screen in the horizontal direction until reaching an imaginary vertical line adjacent the 12 am symbol on the x-axis. This will produce a plurality of vertical lines extending from the x-axis to the 65 volume level, as shown in FIG. 7. Thus, the volume between 8 pm–12:59 am will be set to 65. The other volume levels shown can be set using a similar procedure to the one described above.

In another embodiment, the operator may select one or more of the symbols during one or more of the time periods as follows. The operator interface 32 is employed to interact with the video display 12. The operator interface 32 may comprise physical keys, buttons, a joystick, a trackball, and/or a mouse, etc.

In the trackball/joystick/mouse embodiment of the operator interface 32, the display screen 12, illustrated in FIGS. 2–4, displays an operator set-up screen for selecting various modes of operation such as bikini mode and nude mode by moving a cursor. To turn bikini mode on from 5 pm–5:59 am, an operator moves the joystick, the mouse, or the trackball to move the cursor on the display screen 12 to the intersection of an imaginary horizontal line adjacent the "bikini" symbol on the y-axis and an imaginary vertical line adjacent the 5 pm symbol on the x-axis and presses a key, or a button, or clicks the mouse. The operator then moves the cursor across the screen in the horizontal direction until reaching an imaginary vertical line adjacent the 5 am symbol at which point the operator presses a key, or a button or clicks the mouse. This will produce a plurality of vertical lines extending to the imaginary horizontal line adjacent the "bikini" symbol on the y-axis, as shown in FIG. 3. Thus, the bikini mode is now on for the time period selected, i.e., between 5 pm–5:59 am.

Similarly, referring to FIG. 5, to adjust the volume from 6 am–7:59 pm to 18, an operator moves the joystick, the mouse, or the trackball to move the cursor on the display screen 12 to the intersection of an imaginary horizontal line adjacent the 6 am symbol on the x-axis and an imaginary horizontal line slightly below the 25 symbol on the y-axis. Moving the cursor to this location will display the volume level associated with the vertical displacement of the cursor. Then, by moving the cursor vertically up and down, the volume can be adjusted to the desired level. When the desired volume level is obtained, the operator presses a key, or a button, or clicks the mouse. Then, the operator moves the joystick, the mouse, or the trackball to move the cursor across the screen in the horizontal direction until reaching an imaginary vertical line adjacent the 7 pm symbol on the x-axis. At this point, the operator presses a key, or a button, or clicks the mouse. This will produce a plurality of vertical lines extending from the x-axis to the 18 volume level, as shown in FIG. 5. Thus, the volume between 6 am–7:59 pm will be set to 18. A similar procedure to the one described above is used to set the volume for other time periods.

Therefore, the present invention is directed to a graphical control of a time-based set-up feature for a video game. The graphical interface visually displays a plurality of symbols along a first axis and a plurality of time periods along a second axis. A selector, such as a touch-screen, a mouse, a joystick, a trackball, physical keys, and/or buttons, etc., allows an operator to interact with the graphical interface to select one or more of the symbols during one or more of the time periods. Accordingly, the present invention allows an operator to easily setup a video game using a graphical control that allows selection of multiple "on" time periods for each of several modes of operation and/or selection of one or more magnitudes during one or more of the time periods.

The video game illustrated and described herein has been described in relation to an adult video game. However, other embodiments of the video game are contemplated. It will be appreciated by those skilled in the art that the graphical control of the present invention can be used with any video game that requires adjusting certain parameters.

Thus, while the present invention has been described with reference to one or more embodiments, those skilled in the art will recognize that many changes may be made thereto without departing from the spirit and scope of the present invention which is set forth in the following claims.

What is claimed is:

1. A video game, comprising:
   an interfacing structure for receiving inputs from a player and for displaying a set-up feature having a first axis divided into time periods and a second axis indicating feature magnitudes, said set-up feature further displaying a plurality of movable symbols, each of said movable symbols corresponding to one of said time periods;
   a display for displaying visual symbols viewed by said player;
   a processor for receiving said inputs from said interfacing structure and developing display signals for displaying said visual symbols on said display, said processor monitoring time signals from a clock;
   a memory device coupled to said processor and storing at least two data sets for producing at least two different magnitudes of a certain one of said visual symbols, said processor selecting one of said at least two data sets in response to said processor monitoring a time signal corresponding to a predetermined time and further in response to positions of said movable symbols of said set-up feature.

2. The video game of claim 1 wherein said interfacing structure is a touch screen.

3. The video game of claim 1 wherein said interfacing structure is a mechanical interfacing structure.

4. A method of operating a video game, comprising:
   displaying a set-up feature having a first axis divided into time periods and a second axis indicating magnitudes of erotic content, said set-up feature further having a plurality of movable symbols, each of said movable symbols being movable in the direction of said second axis and being associated with one of said time periods;
   displaying a plurality of standard visual symbols;
   monitoring real time; and
   displaying a plurality of modified visual symbols in response to said real time being a predetermined time and further in response to positions of said movable symbols, said plurality of modified visual symbols having a more erotic theme than said standard visual symbols, said modified visual symbols being appropriate for displaying at said predetermined time as defined by said movable symbols.

5. The method of claim 4 further comprising altering said predetermined time in response to input into a graphical interface.

6. A graphical control of a time-based set-up feature for a video game comprising:
   a graphical interface for visually displaying a plurality of movable symbols of the set-up feature along a first axis and a plurality of time periods along a second axis, each of said movable symbols being associated with a separate time period along said second axis; and
   a selector for interacting with the graphical interface to select one or more of the symbols during one or more of the time periods, each of said plurality of symbols representing a level of volume.

7. A method of graphically controlling a time-based set-up feature for a video game comprising:

visually displaying a plurality of movable symbols of the set-up feature along a first axis and a plurality of time periods along a second axis, said symbols representing magnitudes controlling different levels of erotica that can be used in the video game, the different levels of erotica including no erotica, bikini, and nude, each of said movable symbols being associated with a separate time period along said second axis; and receiving inputs from the graphical interface to select one or more of the symbols during one or more of the time periods.

8. A method of graphically controlling a time-based set-up feature for a video game comprising:

visually displaying a plurality of movable symbols of the set-up feature along a first axis and a plurality of time periods along a second axis, said symbols representing a plurality of levels of volume, each of said movable symbols being associated with a separate time period along said second axis; and receiving inputs from the graphical interface to select one or more of the symbols during one or more of the time periods.

9. A method of controlling levels of game audio volume over time, said method comprising:

displaying a graphical image having a first axis denoting time and a second axis denoting levels of game audio volume, said first axis indicating time periods;

displaying a plurality of movable symbols in said graphical image, said movable symbols being continuously movable in the direction of said second axis and corresponding to said levels of game audio volume, each of said movable symbols being associated with a separate one of said time periods;

receiving input from a user;

moving said movable symbols in response to said input; and controlling said levels of game audio volume over time in response to positions of said movable symbols along said second axis.

10. A method of controlling levels of game erotic content over time, said method comprising:

displaying a graphical image having a first axis denoting time and a second axis denoting levels of game erotic content, said first axis indicating time periods;

displaying a plurality of movable symbols in said graphical image, said movable symbols being continuously movable in the direction of said second axis and corresponding to said levels of game erotic content, each of said movable symbols being associated with a separate one of said time periods;

receiving input from a user;

moving said movable symbols in response to said input; and controlling said levels of game erotic content over time in response to positions of said movable symbols along said second axis.

11. A system for temporally controlling audio volume of a video game comprising:

a graphical display displaying a first axis corresponding to time, a second axis corresponding to audio volume, and a plurality of movable symbols, said first axis being divided into a plurality of time periods, each of said movable symbols being associated with a separate one of said time periods;

a control device for receiving inputs moving said symbols and emitting control signals; and a central processing unit translating the input from the control device and temporally controlling said audio volume of said video game in response to positions of said movable symbols.

12. A system for temporally controlling erotic content of a video game comprising:

a graphical display displaying a first axis corresponding to time, a second axis corresponding to erotic content, and a plurality of movable symbols, said first axis being divided into a plurality of time periods, each of said movable symbols being associated with a separate one of said time periods;

a control device for receiving inputs moving said symbols and emitting control signals; and a central processing unit translating the input from the control device and temporally controlling said erotic content of said video game in response to positions of said movable symbols.

* * * * *